B. BEACH.
Tree Protector.
No. 53,772.
Patented Apr 10, 1866.
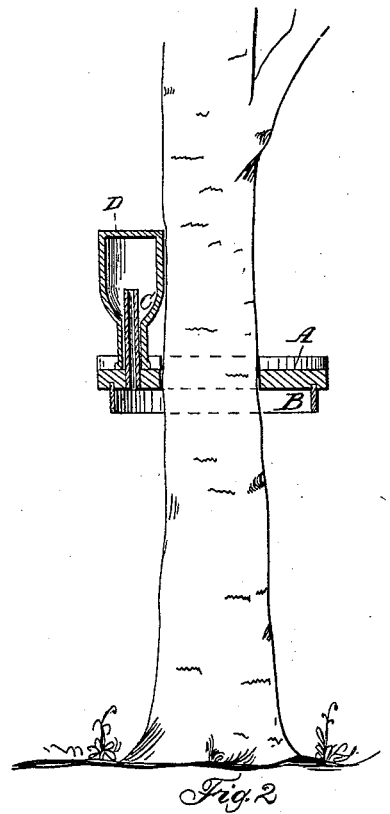
Fig. 2
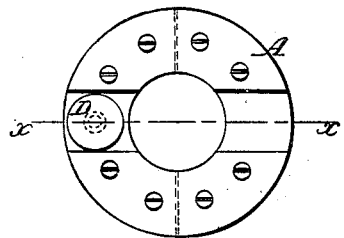
Fig. 3
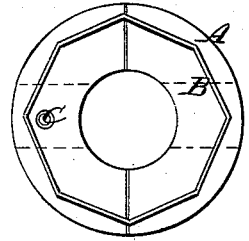
Witnesses
Theo Tusch
J. W. B. Covington
Inventor
B. Beach
By Munn
Attys &Co

UNITED STATES PATENT OFFICE.

BURROUGHS BEACH, OF WEST MERIDEN, CONNECTICUT.

IMPROVEMENT IN TREE-PROTECTORS.

Specification forming part of Letters Patent No. 53,772, dated April 10, 1866; antedated March 30, 1866.

*To all whom it may concern:*

Be it known that I, BURROUGHS BEACH, of West Meriden, in the county of New Haven and State of Connecticut, have invented a new and Improved Tree-Protector; and I do hereby declare that the following is a full, clear, and exact description thereof, which will enable others skilled in the art to make and use the same, reference being had to the accompanying drawings, forming part of this specification, in which—

Figure 1 is a vertical central section of my invention applied to a tree; Fig. 2, a detached plan or top view of the same; Fig. 3, a detached inverted plan of the same.

Similar letters of reference indicate like parts.

This invention relates to a new and improved device for protecting trees from those insects which ascend the trunk, deposit their eggs, and pass through the various transformations, during which the trees are much injured by being deprived of their leaves, upon which the insects subsist.

The invention consists in the employment or use of a disk, of wood or cast-iron, composed of two or more parts, and constructed in such a manner that it may be fitted snugly to the trunk; said disk having a pendent flange, of zinc or other sheet metal, fitted in its under side, and having a tube fitted in it, over which a vessel is placed, all being arranged in such a manner as to effectually prevent the ascent of the insects up the tree.

A represents a disk, which may be constructed of wood or cast-iron and of two or more parts, to admit of its being adjusted to the trunk of a tree and to snugly encompass the same, the parts of the disk being secured together in any proper manner.

The under side of the disk A is provided with a pendent flange, B, of zinc or other sheet metal, said flange being near the edge of the disk and extending all around it, and having a sharp lower edge, over or around which the insects cannot pass so as to get upon the upper surface of the disk, and the latter is fitted snugly to the trunk, so that they cannot pass up between it and the disk.

C is a tube, which is fitted in the disk A, extending entirely through it and projecting a short distance above its upper surface, and over this tube a bottle or any suitable vessel, D, is fitted, in order to catch the insects which will pass up through the tube C, the latter being the only medium by which they can get through the disk, and, availing themselves of it, they are entrapped in the vessel D.

This invention is extremely simple, and may be constructed at a small cost and applied with the greatest facility.

I am aware that disks have been applied to trees and in such a manner as to encompass them, with a view of preventing the ascent of insects; but I am not aware that disks for this purpose have been provided with sheet-metal flanges to prevent the insects passing around from the under to the upper surfaces of said disks, nor am I aware that a tube and vessel have ever been applied to the disks in such a manner as to entrap the ascending insects.

I claim, therefore, as new and desire to secure by Letters Patent—

1. A disk, A, constructed of wood, metal, or other suitable material, and of two or more parts, in such a manner as to admit of being snugly adjusted to the trunk of a tree, in combination with the pendent flange B at the under side of the disk, substantially as and for the purpose set forth.

2. The tube C, inserted in the disk, in connection with the vessel D, substantially as and for the purpose specified.

BURROUGHS BEACH.

Witnesses:
SAVILIAN R. HULL,
W. D. GOODRICH.